United States Patent [19]

Depweg

[11] Patent Number: 4,482,163

[45] Date of Patent: Nov. 13, 1984

[54] SPINDLE POWERED ADJUSTABLE CHUCK

[75] Inventor: Frank A. Depweg, Fairfield, Conn.

[73] Assignee: Litton Industrial Products, Inc., New Britain, Conn.

[21] Appl. No.: 428,046

[22] Filed: Sep. 29, 1982

[51] Int. Cl.$^3$ .................... B23B 31/16; B23B 31/26
[52] U.S. Cl. .................... 279/1 H; 279/112; 279/119
[58] Field of Search .................... 279/1 H, 1 ME, 110, 279/111, 114, 115, 116, 119, 120, 123, 112

[56] References Cited

U.S. PATENT DOCUMENTS

| | | | |
|---|---|---|---|
| 1,698,254 | 1/1929 | Bullard, Jr. | 279/1 H |
| 2,006,621 | 7/1935 | Berg | 279/1 H |
| 2,581,474 | 1/1952 | Evangelista | 279/114 |
| 3,010,728 | 11/1961 | Jennings | 279/110 X |
| 3,909,020 | 9/1975 | Yamano | 279/1 H |
| 3,936,060 | 2/1976 | Hirao | 279/1 H |

*Primary Examiner*—Z. R. Bilinsky
*Attorney, Agent, or Firm*—Spencer T. Smith

[57] ABSTRACT

A spindle powered adjustable chuck for forcefully gripping a workpiece capable of automatically adjusting gripping diameter comprising a support frame having a plurality of radially oriented jaw receiving compartments, jaws displaceable within the jaw receiving compartments, and worm gears for radially displacing the jaws, clamps for simultaneously displacing the jaws to a clamping position preparatory to rotating the chuck for operation, a spindle for rotatively driving the support frame, a planetary gear train including an internally splined sun gear and a plurality of planetary gears, splined shaft for coupling the planetary gears to the worm gears, and a two position splined key for operatively engaging and disengaging the planetary gear train, including a compression spring for biasing the splined key to a first position whereat the planetary gear train is fixed relative to the support frame, whereby rotation of the spindle can rotate a workpiece clamped to the support frame, the splined key being displaceable from the first position to second position acting against the compression spring, thereby rotationally fixing the sun gear of the planetary gear train whereby the support frame is rotatively free of the sun gear, so that rotation of the support frame rotatively drives the planetary gear train, thereby adjusting the gripping diameter through the worm gears.

3 Claims, 3 Drawing Figures

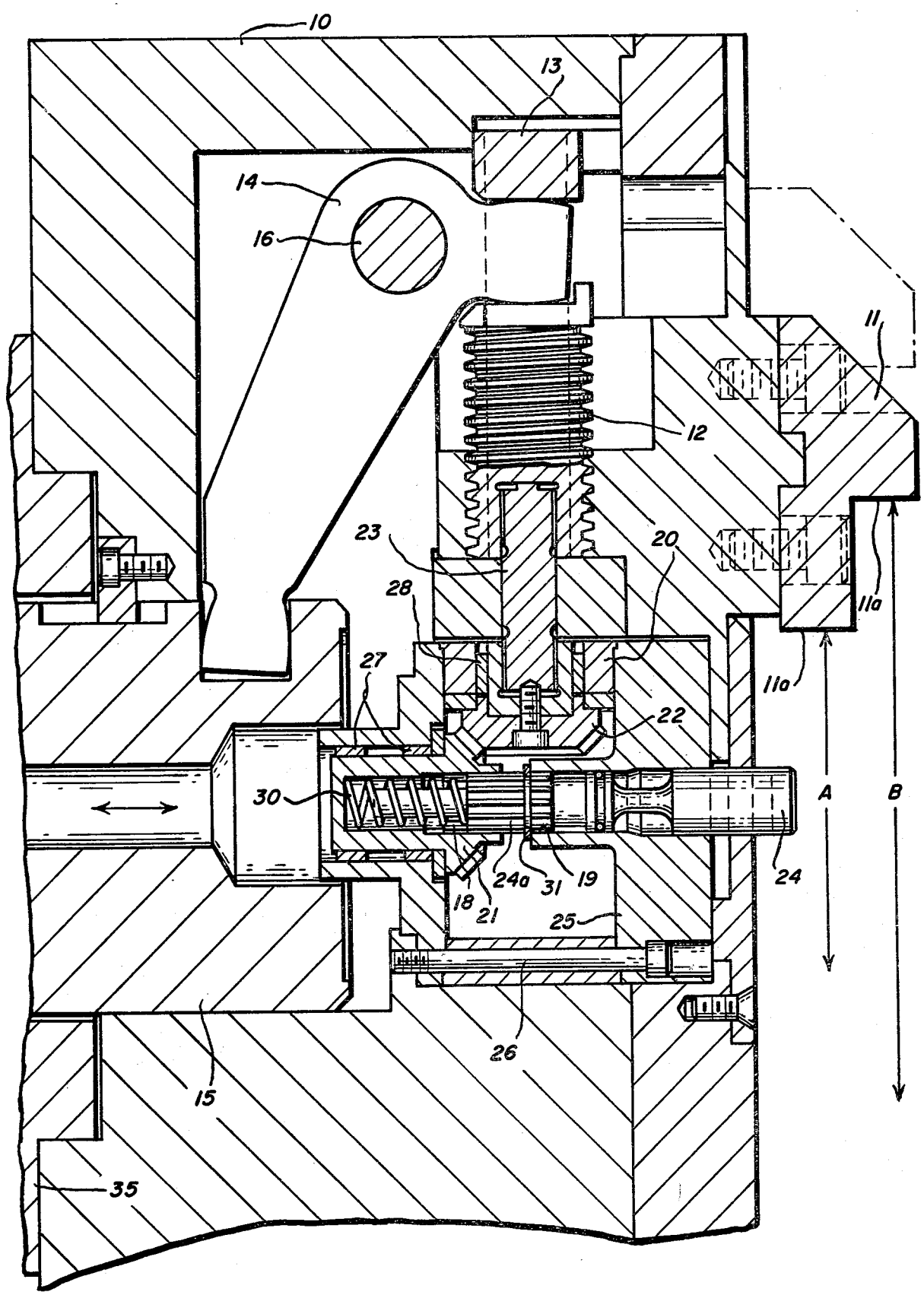
Fig_1

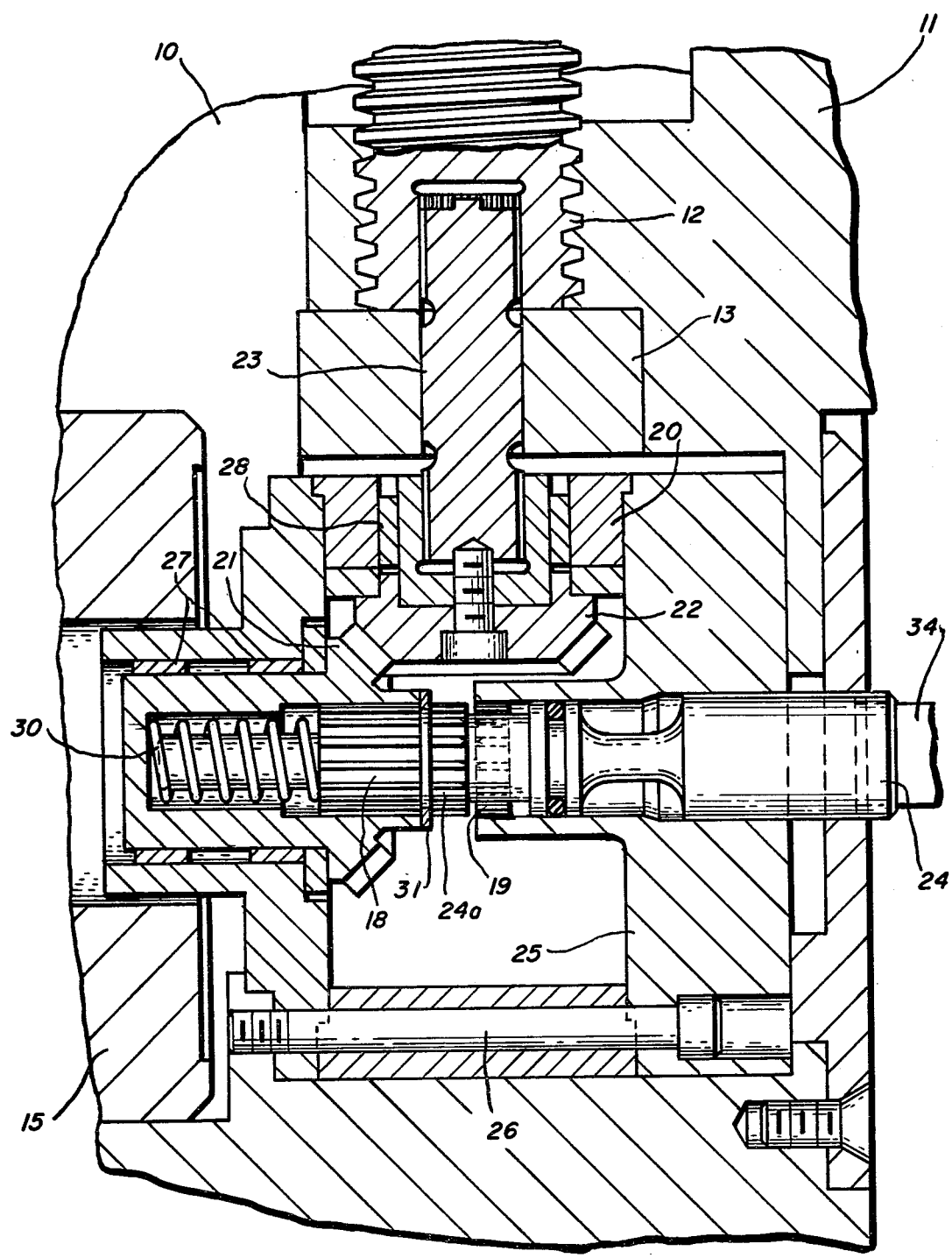
Fig_2

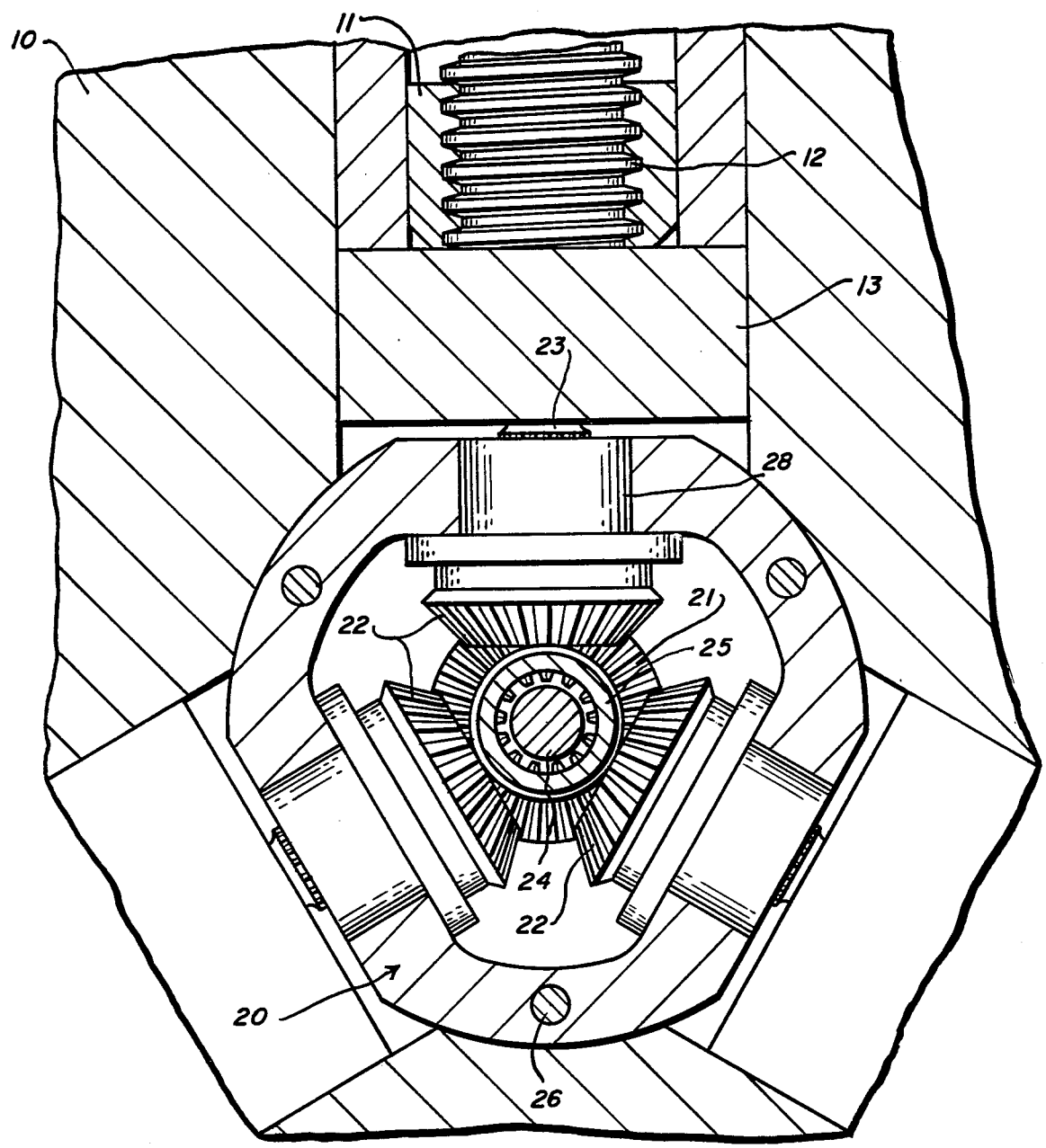
Fig_3

SPINDLE POWERED ADJUSTABLE CHUCK

BACKGROUND OF THE INVENTION

Power-operated chucks are widely used; however, conventionally designed power-operated chucks have a short jaw stroke and a narrow range of gripping diameter.

In order to extend the gripping range of power-operated chucks, work gripping jaws must either be replaced or readjusted. The readjustment process requires manually relocating and remounting of the jaws or the use of secondary tools to drive an adjustable jaw mechanism.

Frequent replacement or readjustment of chuck jaws, as is required in short-run production shops, will greatly reduce the machine utilization and its efficiency. It is evident that an adjustable chuck requiring the use of no secondary tools and at the same time having means for determining gripping diameter without the use of external gauges would be very desirable.

It is, therefore, an object of the invention to provide a spindle powered adjustable chuck.

It is also an object of the invention to provide an adjustable chuck requiring no secondary tools such as wrenches or external power heads.

It is further an object of the invention to provide a chuck adjustor which has means for determining gripping diameters without the use of external gauges or other measuring devices.

These and other objects of the invention will appear to those skilled in the art from the following, considered in conjunction with the accompanying drawings.

The accompanying drawings show the invention embodied in a three jaw chuck. It is understood that the invention applies equally to chucks having one, two or four jaws and the drawings are not to be construed as defining or limiting the scope of the invention.

DESCRIPTION OF THE DRAWINGS

FIG. 1 is a partial sectional view of the chuck in the closed position.

FIG. 2 is an enlarged view of a portion of the chuck shown in FIG. 1 with the chuck in the open position.

FIG. 3 is a sectional view of the chuck at the planetary gear transmission of FIG. 2.

DESCRIPTION OF THE PREFERRED EMBODIMENT

Referring to FIG. 1, a spindle powered adjustable chuck is comprised of a support frame 10 to which is slidably mounted the jaw chucks 11 (one shown). A three jaw chuck is described herein, it being clear that the invention is not limited and can be applied to chucks with one, two, or four jaws as well. The jaws have a plurality of lands 11a which define gripping diameters, two shown, A and B. This plurality of lands 11a effectively increases the range of gripping diameters of the chuck as the jaws are adjusted, as will be described.

The workpiece (not shown) is forcefully gripped by the jaws 11 at either of the lands 11a as the jaws are caused to move toward the chuck centerline thereby reducing the gripping diameter A and B as the chuck goes from an open to a closed position. FIG. 1 illustrates the chuck in the closed position. In this closed position, the jaws 11, which are threadedly engaged to the jaw adjusting screws 12, have been displaced toward the chuck centerline. The adjusting screws 12 are confined in the jaw operator frames 13 which are slidably housed in the support frame 10. Bellcranks 14 engage the operator frames 13 and urge the frames toward the centerline as the pull rod 15, which is coupled in the bellcranks 14, is withdrawn from the chuck, powered by a hydraulic actuator (not shown), causing the bellcranks 14 to rotate about their pivots 16. The workpiece is released as the pull rod 15 enters the chuck, rotating the bellcranks 14 and sliding the jaw operator frames 13 and thereby the jaws 11 away from the chuck centerline. FIG. 2 illustrates the operator frames 13 in the chuck open position as the operator frames are moved radially outward from the transmission housing 20.

As best seen in FIGS. 2 and 3, the transmission housing 20 rotatably supports a planetary gear train comprised of a sun gear 21 and its bearings 27 and three planetary gears 22, and their bearings 28, each of the planetary gears being meshed to the sun gear. Each of the planetary gears is connected to a jaw adjusting screw 12 by means of a splined drive shaft 23 which allows for the radial movement of the operator frame 13 as the jaws open and close.

Referring to FIG. 1, key 24, which, with external splines 24a, couples gear 21 to the transmission housing 20 by simultaneously engaging the internal splines 18 of the gear 21 and the internal splines 19 of transmission housing cover 25, which cover is joined to the transmission housing 20 by fasteners 26. This engagement is maintained by compression spring 30 acting on key 24. Washer 31 limits the travel of key 24 as it seats on cover 25.

The coupling of gear 21 to housing 20 causes the planetary gear train to rotate with the chuck and at the same time retain each planetary gear 22 rotationally fixed about its axis of rotation.

As best seen in FIG. 2, adjustment of the gripping diameters A and B of jaws 11 is accomplished by axially displacing key 24, further compressing spring 31 and disengaging the external splines 24a of key 24 from the internal splines 19 of housing 25. This axial movement is caused by the jaw adjusting tool 34 entering and engaging key 24 so as to rotationally fix the key and sun gear 21 which remains splined to the key. Tool 34 is formed in any of a number of shapes, such as, a blade entering a slot formed in key 24 or an Allen-type wrench entering a mating socket formed into key 24.

Tool 34 is mounted to the tool holder (not shown) of the machine tool (not shown) which is driving the chuck. It is apparent that this chuck is universal and can be utilized on any machine tool where the workpiece is rotated. In the preferred embodiment, the tool holder is advanceably mounted to the machine and by means of controls is automatically indexed and advanced to engage and axially displace key 24.

With the key 24 disengaged from the cover 25 and rotationally fixed, the spindle 35, to which the chuck is mounted through support frame 10, is rotated. As the chuck rotates, the planetary gears 22 rotate about their axes as they rotate about the fixed sun gear 21.

The planetary gear rotation, transmitted through the splined drive shafts 23, turn the jaw adjusting screws 12 causing the jaws 11 which are threadedly engaged to the adjusting screws to move radially in the chuck frame 10. This radial motion increases or decreases the effective gripping diameters A and B of the chuck depending on the direction of rotation of the spindle 35.

By means of a position indicating encoder (not shown) operated from the spindle drive, the at-rest rotational position of the chuck can be precisely set thus allowing accurate engagement of the adjusting tool 34. With the adjusting tool 34 advanced and engaged to the key 24, the position indicating encoder, through conventional digital controls, counts the revolutions of the spindle 35 as it powers the jaw adjusting screws 12 through the planetary gears 22 and stops the spindle as it reaches a predetermined position which represents predetermined gripping diameters A and B of the jaws 11. Through this control arrangement, this universal chuck is made to be independent of an operator after the controls are programmed.

What is claimed is:

1. A spindle powered adjustable chuck for forcefully gripping a workpiece capable of automatically adjusting gripping diameter comprising
    a support frame having a plurality of radially oriented jaw receiving compartments,
        jaw means including a plurality of jaws being displaceable within said jaw receiving compartments, and worm gear means operatively associated with each jaw for radially displacing said jaw means,
    clamping means for simultaneously displacing said jaw means to a clamping position for forcefully engaging the workpiece therebetween preparatory to rotating the chuck for operation,
    spindle means for rotatively driving said support frame,
    adjusting means for simultaneously changing the gripping diameter of said jaw means including
        planetary gear train means including an internally splined sun gear and a plurality of planetary gears,
        splined shaft means for coupling said planetary gears to said worm gear means, and
        two position splined key means for operatively engaging and disengaging said planetary gear train means, including
            compression spring means for biasing said splined key means to a first position whereat said planetary gear train is fixed relative to said support frame, whereby rotation of said spindle can rotate a workpiece clamped to said support frame,
            said splined key means being displaceable from said first position to second position acting against said compression spring means, thereby
            rotationally fixing the sun gear of said planetary gear train means
                whereby said support frame is rotatively free of said sun gear,
                so that rotation of said support frame rotatively drives said planetary gear train means, thereby adjusting said gripping diameter through said worm gear means.

2. A spindle powered adjustable chuck according to claim 1 wherein said clamping means comprises
    bellcrank means rotatively displaceable to operatively engage said jaws comprising said simultaneous jaw displacement means, and
    pull rod means secured to said chuck means for axial displacement in conjunction with said bellcrank means.

3. A spindle powered adjustable chuck according to claim 1 further comprising adjusting tool means
    means for advancing said adjusting tool means to displace said two position splined key means from said first position to said second position including shaped end means to engage said splined key means and maintain it fixed rotationally.

* * * * *